Sept. 22, 1959  R. G. HARRIS  2,905,413
FISHING ROD HOLDER
Filed May 31, 1956
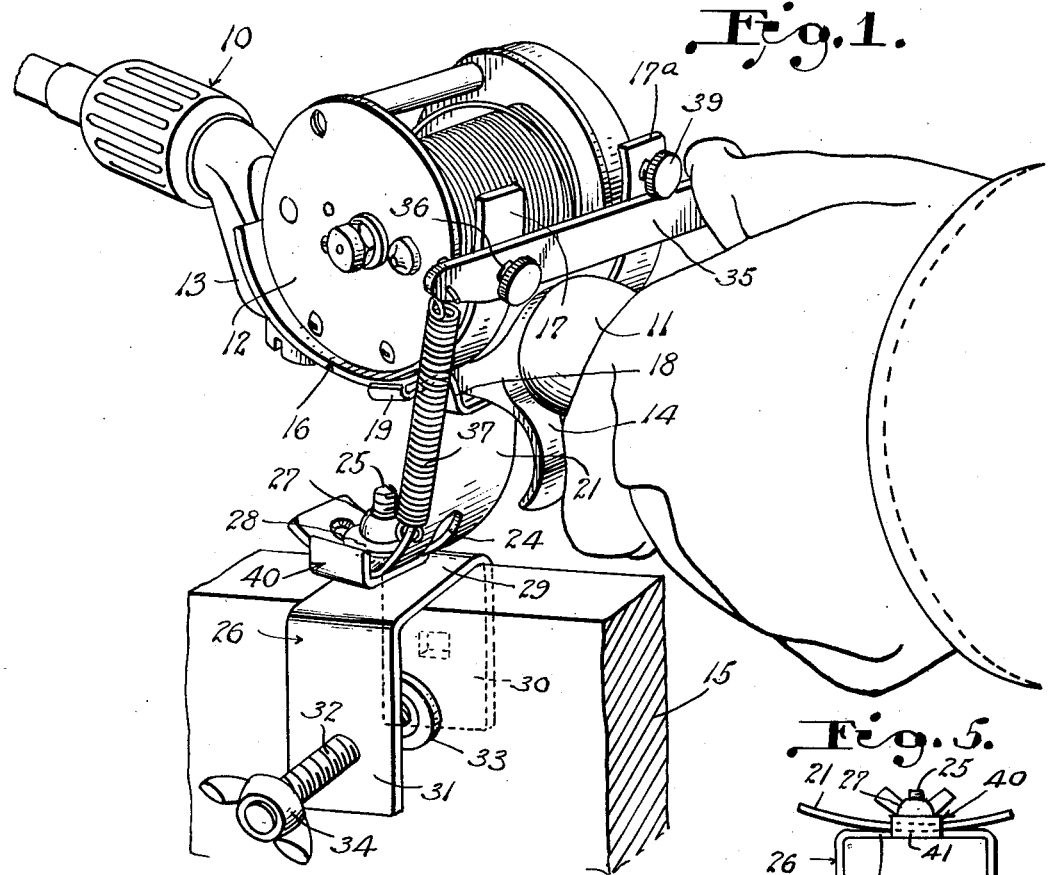
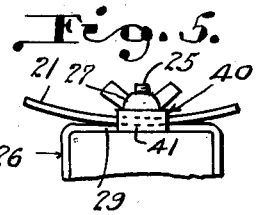
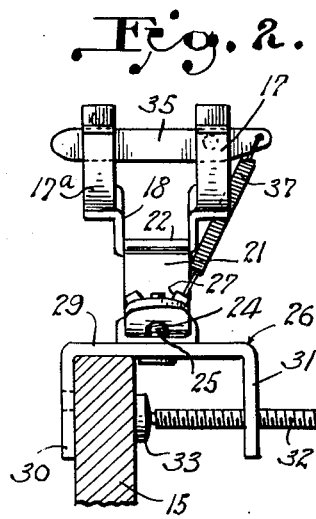
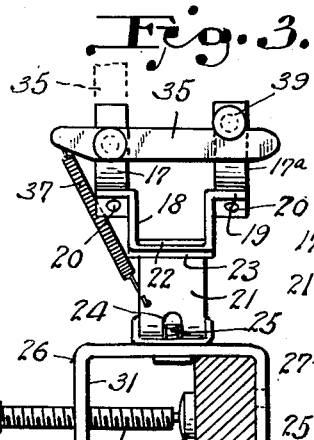
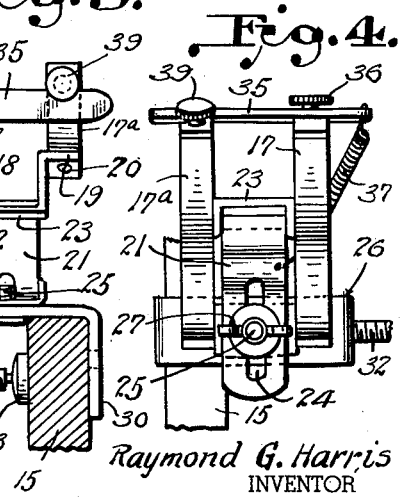
Raymond G. Harris
INVENTOR
BY C.A. Snowles
ATTORNEYS.

United States Patent Office 2,905,413
Patented Sept. 22, 1959

2,905,413

FISHING ROD HOLDER

Raymond G. Harris, McKinney, Tex.

Application May 31, 1956, Serial No. 588,497

1 Claim. (Cl. 248—42)

This invention relates to a fishing rod holder.

An object of this invention is to provide an improved holder for a fishing rod whereby the handle end of the rod may be firmly secured to a support such as a boat or other firm support.

Another object of this invention is to provide a holder of this kind which includes a cradle or saddle within which the reel portion of the rod is adapted to seat with the handle projecting rearwardly therefrom and the holder being either pivotally or fixedly secured to a clamp depending on the character of the fishing, that is whether the fishing rod is held in one hand or whether the fishing rod is firmly anchored for fishing by trolling.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a perspective view of a fishing rod holder constructed according to an embodiment of this invention.

Fig. 2 is a front elevation of the device.

Fig. 3 is a rear elevation of the device.

Fig. 4 is a plan view of the device.

Fig. 5 is a fragmentary side elevation showing the device in trolling position.

Referring to the drawing, the numeral 10 designates generally a fishing rod having a handle 11 with a reel 12. The handle 11 includes an offset reel holding portion 13 with a finger piece 14 at the forward end of the handle 11 and projecting from the reel portion of the offset 13. In order to provide means whereby the rod 10 may be supported from a supporting element such as 15, I have provided a cradle generally indicated at 16. The cradle 16 is formed of a pair of longitudinally curved or arcuate bearings 17 which are connected together at the bottom portion thereof by a U-shaped connecting bar 18 having parallel ends 19 which may be welded or otherwise secured as indicated at 20, with the lower sides of the bars 17. The connecting bar 18 is supported by means of a longitudinally bent supporting bar 21 having an upper end 22 fixed as by welding or the like, to the inner side of the bight portion 23 of the U-shaped member 18. The supporting member 21 is provided with an elongated slot 24 through which the shank 25 of a bolt is adapted to loosely engage. The bolt 25 extends upwardly through an inverted U-shaped clamp 26 and a wing nut 27 is threaded on the shank 25 and bears against the upper concave side of the supporting member 21. A washer 28 is preferably interposed between the wing nut 27 and the concave side of the supporting member 21. The clamping member 26 includes a horizontal bight member 29 with depending parallel arms 30 and 31. A threaded bolt or pressure applying member 32 having a swiveled head 33 is threaded through the arm 31 and the outer end of the bolt 32 has a wing member 34 fixedly secured thereto.

In order to provide a means whereby the handle 11 and the reel holder 13 may be firmly secured relative to the saddle 17, I have provided a locking bar 35 which is pivoted on a pivot pin 36 carried by one of the saddle members 17. The locking bar 35 is engageable over the upper side of the handle 11, as shown in Fig. 1, and a spring 37 is secured at one end to the projecting end 38 of the bar 35 and is secured at the other end to a lower portion of the supporting member 21. A headed keeper member 39 projects rearwardly from the other one 17ᵃ of the cradle members 17 and the locking bar 35 is adapted to engage under the head of the keeper member 39, as shown in Fig. 1. A U-shaped washer 40, as shown in Fig. 1 is interposed between the convex lower side of supporting member 21 and the bight 29 of U-shaped member 26.

When it is desired to lock the fishing rod 10 with the supporting member 21 relative to the clamp 26 the U-shaped washer 40 is inverted as shown in Fig. 5 and is positioned on the upper side of supporting member 21. The parallel arms 41 of washer 40 extend over the opposite edges of supporting member 21 and also project over the opposite edges of the bight 29 of clamping member 26.

In the use and operation of this rod and reel holder the handle portion including the reel holder 13 is mounted in the cradle 17 by disengaging the locking bar 35 so as to permit spring 37 to swing this bar upwardly to dotted line position, as shown in Fig. 3. This is easily and quickly accomplished by pressing the free end of locking bar 35 downwardly out of engagement with keeper 37 and then swinging the locking bar 35 rearwardly so that the bar 35 will pass the keeper 37.

It will be understood that there is substantial play between the pivot bolt 36 and bar 35 so that the latter may be swung forwardly or rearwardly as may be desired. After the reel 12 is disposed in the cradle 17 with handle 11 projecting rearwardly, the locking bar 35 is swung downwardly to a position across the cradle members 17 and 17ᵃ. The free end of the locking bar 35 is then engaged beneath the headed keeper member 39, as shown in Fig. 1.

In the event it is desired to quickly disengage the rod from the support, this can be easily accomplished by swinging the locking member 35 downwardly and rearwardly a slight degree and then releasing the locking bar for upward swinging under the tension of spring 37. The handle and reel may then be quickly and easily raised upwardly to a position disengaged from the holder.

What is claimed is:

A fishing rod holder comprising a clamp, an arcuate reel supporting saddle, a longitudinally curved supporting bar fixed at one end to said saddle, said bar having an elongated slot adjacent the opposite end thereof, a bolt extending upwardly from said clamp and projecting through said slot, a nut threaded on said bolt for securing said bar in angularly adjusted position, said saddle comprising a pair of spaced apart arcuate bars, a U-shaped member having its legs secured one to each said pair of bars and its bight to said supporting bar, a locking bar pivotally carried by one of said pair of arcuate bars adjacent one end thereof, a spring extending between said locking bar and said supporting bar constantly urging said locking bar to latching position, a headed keeper carried by the other one of said pair of arcuate bars adjacent its end for releasably holding said locking bar in locking position extending transversely between said pair of arcuate bars, and a U-shaped locking washer engaging in an inverted position over said supporting bar and the opposite edges of said clamp for locking said supporting bar against turning relative to said clamp.

References Cited in the file of this patent

UNITED STATES PATENTS

| | | |
|---|---|---|
| 2,220,234 | Hadaway | Nov. 5, 1940 |
| 2,606,731 | Harris | Aug. 12, 1952 |